UNITED STATES PATENT OFFICE.

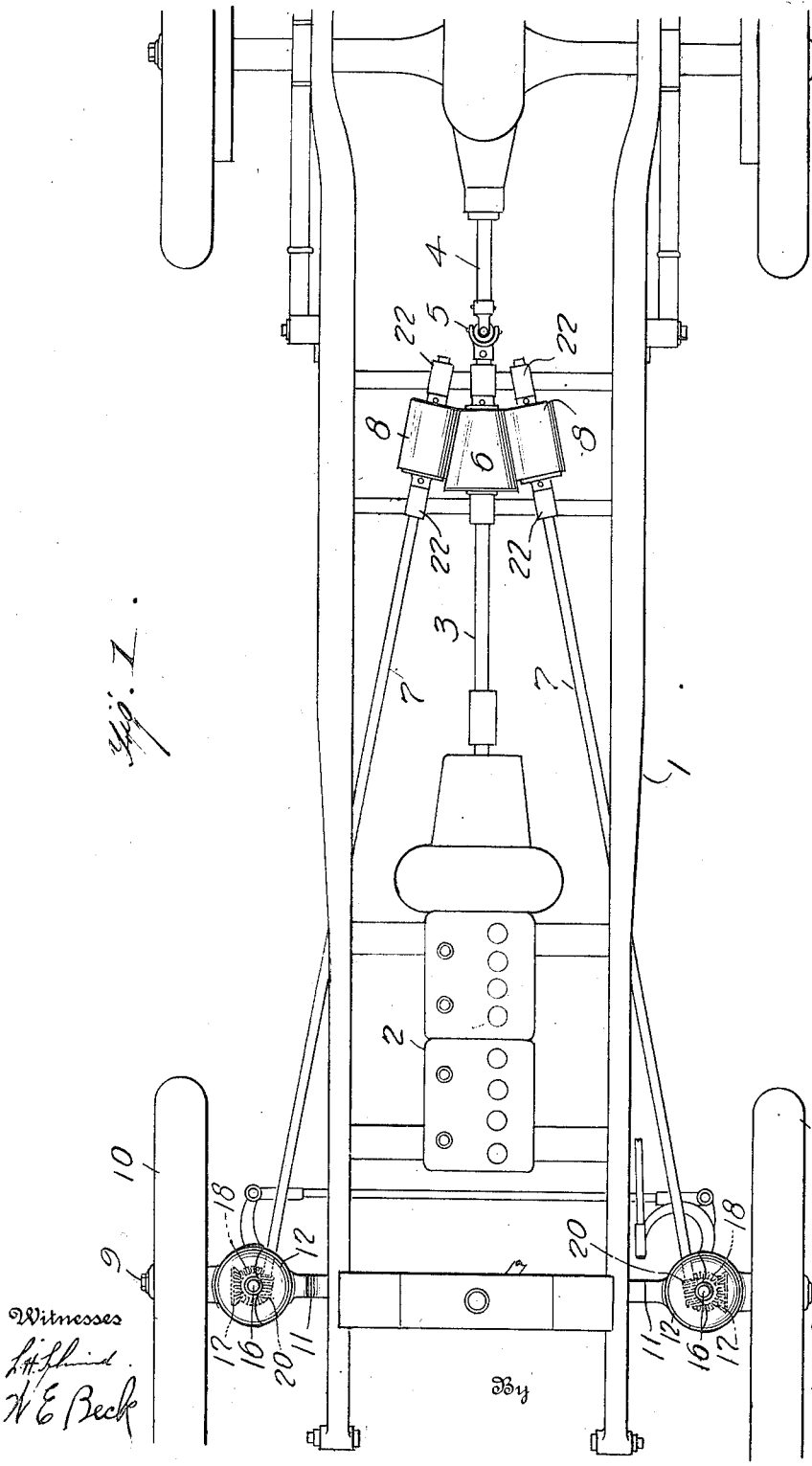

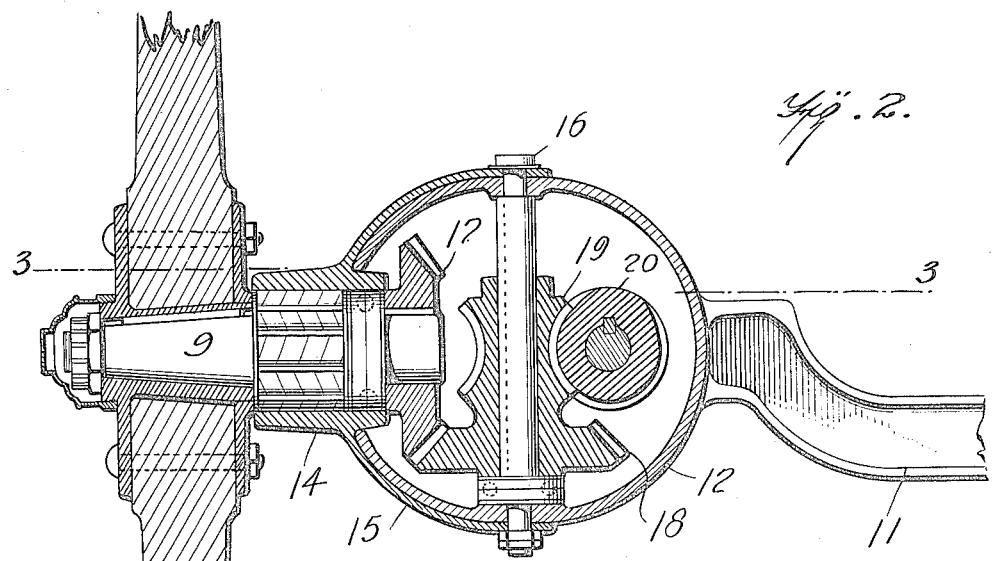
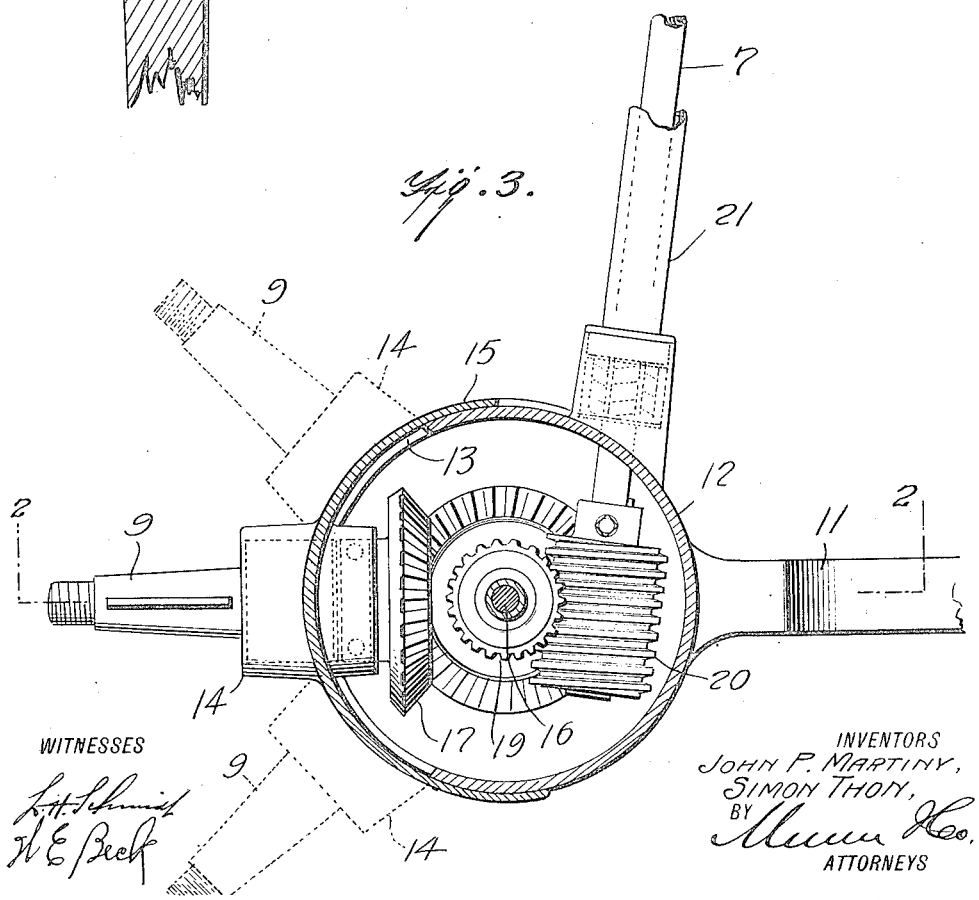

JOHN P. MARTINY AND SIMON THON, OF BIG RAPIDS, MICHIGAN.

POWER TRANSMISSION.

1,249,160. Specification of Letters Patent. Patented Dec. 4, 1917.

Application filed May 28, 1917. Serial No. 171,409.

*To all whom it may concern:*

Be it known that we, JOHN P. MARTINY and SIMON THON, citizens of the United States, and residents of Big Rapids, in the county of Mecosta and State of Michigan, have invented new and useful Improvements in Power Transmissions, of which the following is a specification.

Our invention is an improvement in power transmissions, and has for its object to provide mechanism of the character specified adapted for use in motor vehicles, wherein means is provided for connecting the motor with the front wheels, to provide for a four wheel drive, without interfering with the turning of the wheels to guide the vehicle.

In the drawings:

Figure 1 is a top plan view of the improved transmission;

Fig. 2 is a section on the line 2—2 of Fig. 3;

Fig. 3 is a section on the line 3—3 of Fig. 2.

The present embodiment of the invention is shown in connection with a motor vehicle 1, having the usual motor 2 connected to the rear wheels by the motor shaft 3 and the transmission shaft 4, the shafts 3 and 4 being connected by a universal joint 5.

A cone wheel 6 is arranged on the motor shaft near the universal joint, and auxiliary transmission shafts 7 are mounted on each side of the shaft 3, each shaft 7 being inclined outward toward its front, and having a wheel 8 of cylindrical form engaging the cone wheel. Thus the shafts 7 are driven by the cone wheel 6, and these shafts have a driving connection at the front ends with the spindles 9 upon which the front wheels 10 are journaled. The wheels 10 are keyed to the spindles 9 as shown, and the spindles are connected to the front axle 11 by the joint shown in Figs. 2 and 3. The axle has at each end a substantially spherical housing 12, which is provided with a circumferentially extending slot 13 at the side remote from the axle.

The spindle is journaled in a bearing sleeve or hub 14, which has a substantially semi-spherical housing 15 in connection therewith, and the said housing fits about the outer side of the housing 12, the hub 14 extending through the slot 13 and being movable therein. The housings 12 and 15 are pivotally connected by a bolt 16 which is at the axis of the housings, and it will be evident that with this construction the spindle may swing laterally with respect to the housings to guide the vehicle.

The inner end of each spindle is provided with a bevel gear wheel 17, which meshes with a similar gear 18 on the bolt 16. The hub of the bevel gear 18 is a worm wheel 19, and this worm wheel meshes with a worm 20 on the auxiliary transmission shaft 7. The transmission shafts 7 are arranged in housings 21. The position of the worm wheel and the bevel gear is fixed, and the bevel gear 17 may move with respect to the bevel gear 18 to permit the movement of the spindle, and these shafts are journaled at their rear ends in bearings 22 on the frame.

The rear wheels of the vehicle are driven in the usual manner from the motor. With the improvement it is possible to drive all four wheels.

We claim:

1. In a motor vehicle, the combination with the front axle and the spindles, of a pivotal connection between the spindle and the axle and comprising a substantially spherical housing at each end of the axle, a bearing sleeve for the spindle having a substantially semi-spherical housing fitting outside of the first named housing, said first named housing having a slot for the spindle and the spindle having a bevel gear wheel within the housing, a pivot pin connecting the housings, a bevel gear on the pivot pin with which the first named gear meshes, the said last named bevel gear carrying a worm wheel, and auxiliary transmission shafts having a frictional driving connection with the motor shaft and having a worm in the housing engaging the last named worm.

2. In a motor vehicle, the combination with the front axle and the spindles, auxiliary transmission shafts having a frictional driving connection with the motor shaft, a bevel gear at the pivotal connection of each spindle, each spindle having a gear meshing therewith, a worm wheel rigid with each bevel gear, and a worm on each transmission shaft meshing with the adjacent worm gear.

JOHN P. MARTINY.
SIMON THON.

Witnesses:
H. S. LUCAS,
M. H. MEHL.